(12) United States Patent
Premm et al.

(10) Patent No.: US 11,217,997 B2
(45) Date of Patent: Jan. 4, 2022

(54) REGULATING METHOD FOR A DECENTRALIZED ENERGY GENERATING SYSTEM, AND DECENTRALIZED ENERGY GENERATING SYSTEM

(71) Applicant: SMA Solar Technology AG, Niestetal (DE)

(72) Inventors: Daniel Premm, Kaufungen (DE); Cornelius Fuetterer, Gernrode (DE); Oliver Glitza, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 0 days.

(21) Appl. No.: 17/007,435

(22) Filed: Aug. 31, 2020

(65) Prior Publication Data
US 2020/0403413 A1 Dec. 24, 2020

Related U.S. Application Data

(63) Continuation of application No. PCT/EP2019/054187, filed on Feb. 20, 2019.

(30) Foreign Application Priority Data

Mar. 1, 2018 (DE) .............. 10 2018 104 666.9

(51) Int. Cl.
*H02J 3/38* (2006.01)
*H02J 3/16* (2006.01)

(52) U.S. Cl.
CPC .............. *H02J 3/381* (2013.01); *H02J 3/16* (2013.01)

(58) Field of Classification Search
CPC .......... H02J 3/381; H02J 3/16; H02J 2300/24; H02J 2300/20; H02J 3/383; H02J 3/382; Y02E 10/56
See application file for complete search history.

(56) References Cited

U.S. PATENT DOCUMENTS

2010/0312409 A1 12/2010 Zeumer
2012/0004781 A1* 1/2012 Santos ................ H02J 3/241
700/287

(Continued)

OTHER PUBLICATIONS

International Search Report dated May 14, 2019 in connection with PCT/EP2019/054187.

*Primary Examiner* — Toan T Vu
(74) *Attorney, Agent, or Firm* — Eschweiler & Potashnik, LLC

(57) ABSTRACT

A method for regulating a decentralized energy generating system with a plurality of inverters (IN) is disclosed. The method includes receiving at the PPC a detected active power, reactive power and voltage amplitude at a grid connection point (PCC) of the energy generating system; and regulating, in a normal operating mode of the energy generating system, the reactive power and the active power to target values stipulated by a grid operator by virtue of the central control unit (PPC) dividing the stipulated target values into individual target stipulations for the plurality of inverters (IN) and communicating individual target stipulations to the inverters (IN). The method further includes selectively changing to a special operating mode of the energy generating system if particular criteria are present at the grid connection point (PCC) in a stipulated time interval. In the special operating mode, the central control unit (PPC) effects a reduction of the active power provided at the grid connection point (PCC) compared to the stipulated target values.

8 Claims, 4 Drawing Sheets

(56) References Cited

U.S. PATENT DOCUMENTS

| | | |
|---|---|---|
| 2013/0154614 A1 | 6/2013 | Gadiraju |
| 2013/0300118 A1* | 11/2013 | Bech ................. H02J 3/381 290/44 |
| 2015/0148974 A1 | 5/2015 | Diedrichs |
| 2018/0375329 A1 | 12/2018 | Kuroda |

* cited by examiner

REGULATING METHOD FOR A DECENTRALIZED ENERGY GENERATING SYSTEM, AND DECENTRALIZED ENERGY GENERATING SYSTEM

CROSS REFERENCE TO RELATED APPLICATIONS

This application is a continuation of International Patent Application number PCT/EP2019/054187, filed on Feb. 20, 2019, which claims priority to German Patent Application number 10 2018 104 666.9, filed on Mar. 1, 2018, and is hereby incorporated by reference in its entirety.

FIELD

The disclosure relates to a method for regulating a decentralized energy generating system with a plurality of inverters, and to such an energy generating system.

BACKGROUND

In a decentralized energy generating system, for example a photovoltaic array or a wind park, a plurality of generators are interconnected and output a generated power to a connected grid via a grid connection point. For control purposes, the energy generating system comprises a central control unit, also called park regulator, which ensures that specific present target values of an active power and a reactive power, said target values being stipulated by the grid operator, are provided at the grid connection point. The central control unit drives a plurality of inverters in order to provide said target values, wherein generators are respectively assigned to the inverters and the inverters convert the power generated by the generators into a grid-conforming AC voltage.

It is known that compliance with the target values at the grid connection point can be achieved by the central control unit stipulating for each inverter a frequency droop P(f) and/or a voltage droop Q(U), and optionally modifying the latter such that the active power and/or respectively reactive power provided by all the inverters jointly at the grid connection point corresponds to the target values. At the same time, the decentralized energy generating system in this way strives to attain stable grid conditions, that is to say compliance with tolerance bands of the grid frequency f and/or respectively the voltage amplitude U.

Furthermore, it is known that the uptake capacity of the grid for power fed in is limited and can be described by so-called "nose curves", as shown by way of example in FIG. 1. In FIG. 1, the active power fed in at the grid connection point is plotted on the X-axis, while the voltage amplitude at the grid connection point is plotted on the Y-axis. On the basis of two "nose curves", designated by I, II, which correspond to different grid states, it is evident that at a grid voltage Ucrit there is a point of maximum active power uptake Pmax of the grid. This point separates a first value range having grid voltages that are greater than the voltage Ucrit assigned to the point of maximum active power uptake Pmax, in which first value range the grid is stable, from a second value range having grid voltages that are less than the voltage Ucrit assigned to the point of maximum active power uptake Pmax, in which second value range the grid is unstable. Therefore, stable grid operation necessitates operating the decentralized energy generating system in the first value range such that the point of maximum active power uptake Pmax is not reached or even exceeded, since this can result in a grid failure.

Since the profile of the "nose curve" varies over time, inter alia also on account of a varying reactive power provision of the decentralized energy generating system itself, the point of maximum active power uptake Pmax also shifts and/or respectively the assigned voltage Ucrit shifts. It is therefore not possible to ensure stable infeed operation of the decentralized energy generating system on the basis of a simple power criterion or voltage criterion. Rather, in the prior art, decentralized energy generating systems are approved only if their maximum possible active power infeed under all grid conditions is less than the smallest maximum active power uptake Pmax at their grid connection point giving consideration to all possible operating conditions of the grid. This has the effect that particularly in grid regions with an even just occasionally weak grid link, no or at least only small decentralized energy generating systems are able to be approved. The possibilities of decentralized power provision into such a grid are thus limited.

SUMMARY

The present disclosure is directed to a regulating method for a decentralized energy generating system and a decentralized energy generating system which can reliably recognize that under the given grid conditions the active power infeed threatens to exceed the power uptake capacity of the connected grid, and which in this case react independently in a suitable manner such that a stable infeed operation is ensured under all grid conditions that occur.

One aspect of the present disclosure relates to a method for regulating a decentralized energy generating system with a plurality of inverters, the infeed of which into a grid is determined by driving by means of a central control unit. In this case, in a normal operating mode of the energy generating system, the central control unit detects and regulates an active power, a reactive power and a voltage amplitude at a grid connection point of the energy generating system to target values stipulated by a grid operator by virtue of the central control unit dividing said target values into individual target stipulations for the plurality of inverters and communicating said individual target stipulations to the inverters. By way of example, the central control unit stipulates for the inverters a frequency droop P(f) and/or a voltage droop Q(U) as a function of the target values, that is to say that the inverters vary their fed-in active power P as a function of the measured grid frequency f and/or respectively they adapt their reactive power Q as a function of a measured voltage amplitude U.

In the regulating method according to the disclosure a change to a special operating mode of the energy generating system takes place if the following three events are ascertained at the grid connection point in a stipulated time interval:

1. a decrease in the voltage amplitude by more than a stipulated first threshold value;
2. an active power increase by more than a stipulated second threshold value; and
3. a reactive power change which does not exceed a stipulated third threshold value in the direction of an underexcitation.

The monitoring of the mentioned electrical characteristic variables at the grid connection point is, in one embodiment, carried out by the central control unit. In the special operating mode, the fed-in active power and/or respectively reactive power are/is no longer determined on the basis of the target values. Instead, the central control unit effects a reduction of the active power provided at the grid connection point, for example by driving the inverters in a modified manner compared to the normal operating mode, in particular by communicating correspondingly changed individual special target stipulations to the plurality of inverters. However, this does not preclude the active power provided at the grid connection point still also being concomitantly determined by the target values, that is to say for example the power being reduced by a stipulated absolute value or a stipulated factor of said target values, which would likewise be conceivable.

In one embodiment, in the special operating mode, in addition to the reduction of the active power, the central control unit effects an increase in the reactive power provided at the grid connection point in the direction of an overexcitation, independently of the target values, for example by correspondingly changed individual special target stipulations of a reactive power also being communicated to the inverters. This measure results in an additional stabilization of the grid.

The change of the decentralized energy generating system to the special operating mode can be signaled to the grid operator. A return to the normal operating mode can likewise be signaled to the grid operator. A return to the normal operating mode takes place if it is ensured that an infeed in accordance with the target values stipulated by the grid operator does not jeopardize a stable grid state. By way of example, while observing the voltage amplitude at the grid connection point it is possible to increase the fed-in active power of the decentralized energy generating system step by step or continuously in the direction of the corresponding target value and, upon this target value being reached, to return to the normal operating mode.

Alternatively, the grid operator can communicate a suitable control signal to the central control unit if the grid operator is certain that an infeed of the decentralized energy generating system corresponding to the target values will not result in an unstable grid state, whereupon the central control unit returns the decentralized energy generating system to the normal operating mode.

In one embodiment, ascertaining the decrease in the voltage amplitude and ascertaining the active power increase are carried out by comparing differences between actual values at the beginning and at the end of the stipulated time interval to the respective threshold values. However, it is also conceivable, for example, to use the respective maximum value and the respective minimum value within the stipulated time interval in the difference formation. It goes without saying that suitably averaged values can also be used instead of actual values.

The duration of the stipulated time interval is, in one embodiment, chosen to be between 1 second and 10 minutes, shorter intervals resulting in a faster reaction time of the decentralized energy generating system, but also in an increased probability of erroneous initiation of the special operating mode.

In one modification of the method according to the disclosure, it is also conceivable to provide a plurality of time intervals, for example two thereof, with different lengths for checking whether the criteria for the change to the special operating mode are satisfied, wherein the time intervals with different lengths are also assigned different first to third threshold values. A change to the special operating mode can take place if the criteria are satisfied for any one of the time intervals, or if the criteria are satisfied in a plurality or even all of the time intervals simultaneously or in a sufficiently short time sequence.

In a further aspect of the disclosure, a decentralized energy generating system with a plurality of inverters comprises a central control unit configured to drive the plurality of inverters, wherein the driving comprises, in a normal operating mode, dividing and communicating individual target stipulations, for example a frequency droop $Q(U)$ and/or a voltage droop $P(f)$, to the plurality of inverters depending on target values stipulated by a grid operator for an infeed of active power and reactive power into a grid via a grid connection point of the decentralized energy generating system. A decentralized energy generating system according to the disclosure comprises the central control unit configured to effect a change to a special operating mode of the energy generating system by effecting a reduction of the active power provided at the grid connection point compared to the target values by means of driving the inverters in a modified manner compared to the normal operating mode if the following three events are ascertained at the grid connection point in a stipulated time interval:

1. a decrease in the voltage amplitude by a stipulated first threshold value;
2. an active power increase by a stipulated second threshold value; and
3. a reactive power change which does not exceed a stipulated third threshold value in the direction of an underexcitation.

Such a decentralized energy can be dimensioned in such a way that its maximum possible active power output is greater than a maximum permissible active power uptake capacity of the grid connected to the grid connection point taking account of a power exchange of other grid participants connected to the grid. Such a maximum permissible active power uptake capacity is determined by the smallest value which the maximum active power uptake Pmax at the grid connection point can have in the context of a worst-case scenario, optionally taking account of an additional safety margin. This allows the connection of decentralized energy generating systems having such a high maximum infeed power that they would not be able to be approved using regulating methods according to the prior art on account of possible destabilization of the grid.

BRIEF DESCRIPTION OF THE DRAWINGS

The operating principle of the disclosure is explained in greater detail below with reference to figures, in which.

DETAILED DESCRIPTION

Figure 1:
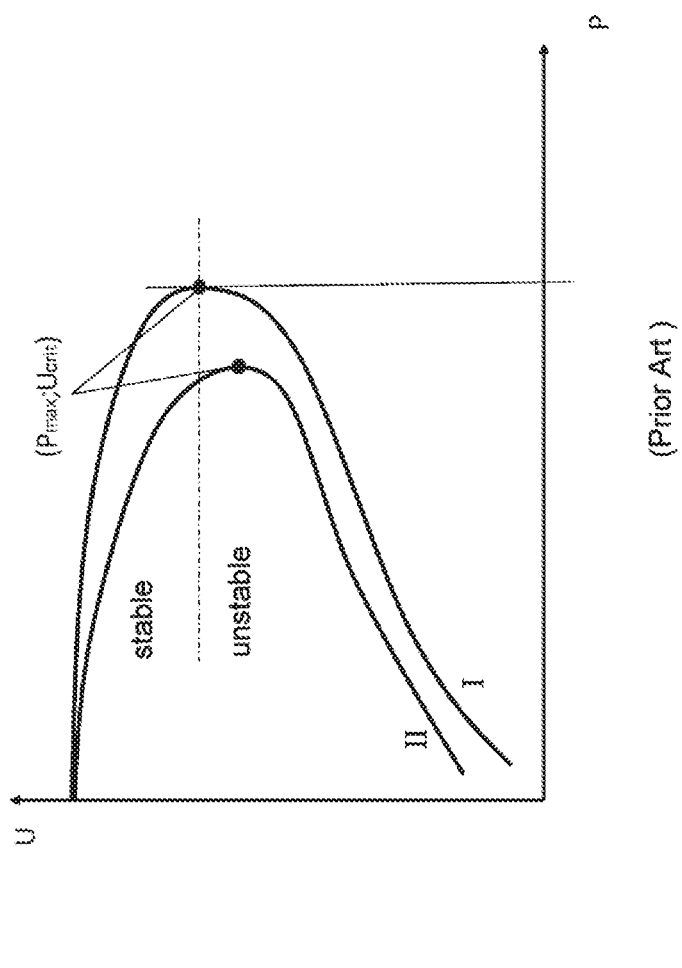
FIG. 1 shows typical profiles of so-called "nose curves"
Figure 2:
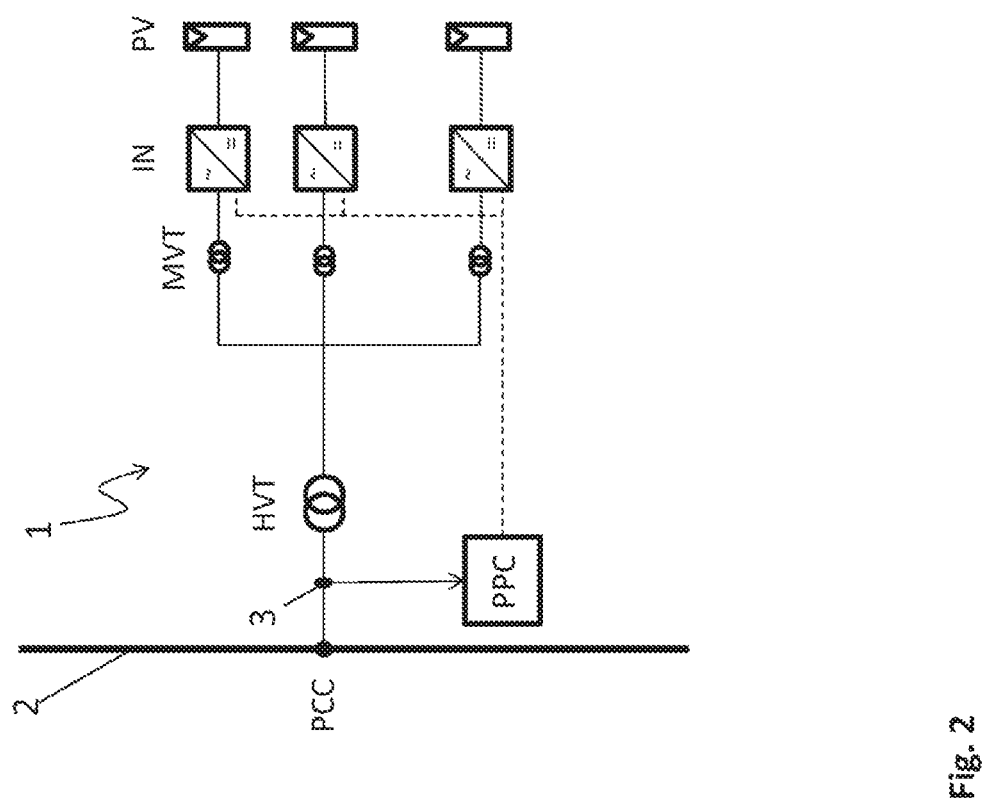
FIG. 2 shows an energy generating system according to the disclosure.

FIG. 2 shows an energy generating system 1 according to the disclosure, which, for the infeed of electrical power into a grid 2, in this case a high-voltage grid, is connected to the grid 2 at a grid connection point PCC. The energy generating system 1 comprises a plurality of generators PV, in this case photovoltaic generators, which are respectively connected to an inverter IN assigned thereto. On the output side, the inverters IN are connected to one another via a medium-voltage transformer MVT and the medium-voltage transformer MVT is connected to a primary side of a high-voltage transformer HVT. The secondary side of the high-voltage HVT is in turn connected to the grid connection point PCC. Arranged between the secondary side of the high-voltage transformer HVT and the grid connection point PCC is a measuring point 3, which determines grid parameters of the grid 2 and infeed parameters of the energy generating system 1 and communicates them to a central control unit PPC. The grid parameters can comprise a voltage and a frequency of the grid 2, and the infeed parameters can comprise an active power and a reactive power of the energy generating system 1. Depending on the spatial extent and rated power of the energy generating system 1, it is also possible to realize more or fewer voltage levels within the system by adding or omitting transformers.

Besides the parameters determined by the measuring point 3, the control unit PPC is furthermore configured to receive target values for the active power and/or the reactive power of the energy generating system 1, said target values being stipulated by a grid operator. In a normal operating mode of the energy generating system 1, the control unit PPC regulates the reactive power and active power values fed in at the grid connection point PCC to the stipulated target values by virtue of said control unit converting the target values to individual target stipulations for each of the inverters IN and communicating said individual target stipulations to the corresponding inverters IN, as illustrated by the dashed lines.

Both the stipulated target values of the grid operator and the individual target stipulations for the plurality of inverters IN, can have different formats. By way of example, it is possible to stipulate absolute power values, relative power values in relation to the currently available power or characteristic curves, for example in parameter form. In this regard, active power, relative or absolute, can be stipulated for example as a characteristic curve $P(f)=P0-cP*(f-f0)$, wherein P0 is a reference power, f0 is a reference frequency, f is a grid frequency determined by the measuring point 3, and cP is a characteristic curve gradient. Correspondingly, for the reactive power it is possible to stipulate a characteristic curve $Q(U)=Q0+cQ*(U-U0)$ with a reference power Q0, a reference voltage U0, a grid voltage amplitude U determined by the measuring point 3, and a characteristic curve gradient cQ. However, it is also conceivable for only limit values which are not permitted to be exceeded and/or respectively undershot to be communicated as target values or target stipulations. Further known forms of the stipulation of target values are likewise conceivable and contemplated by the present disclosure.

Figure 3:
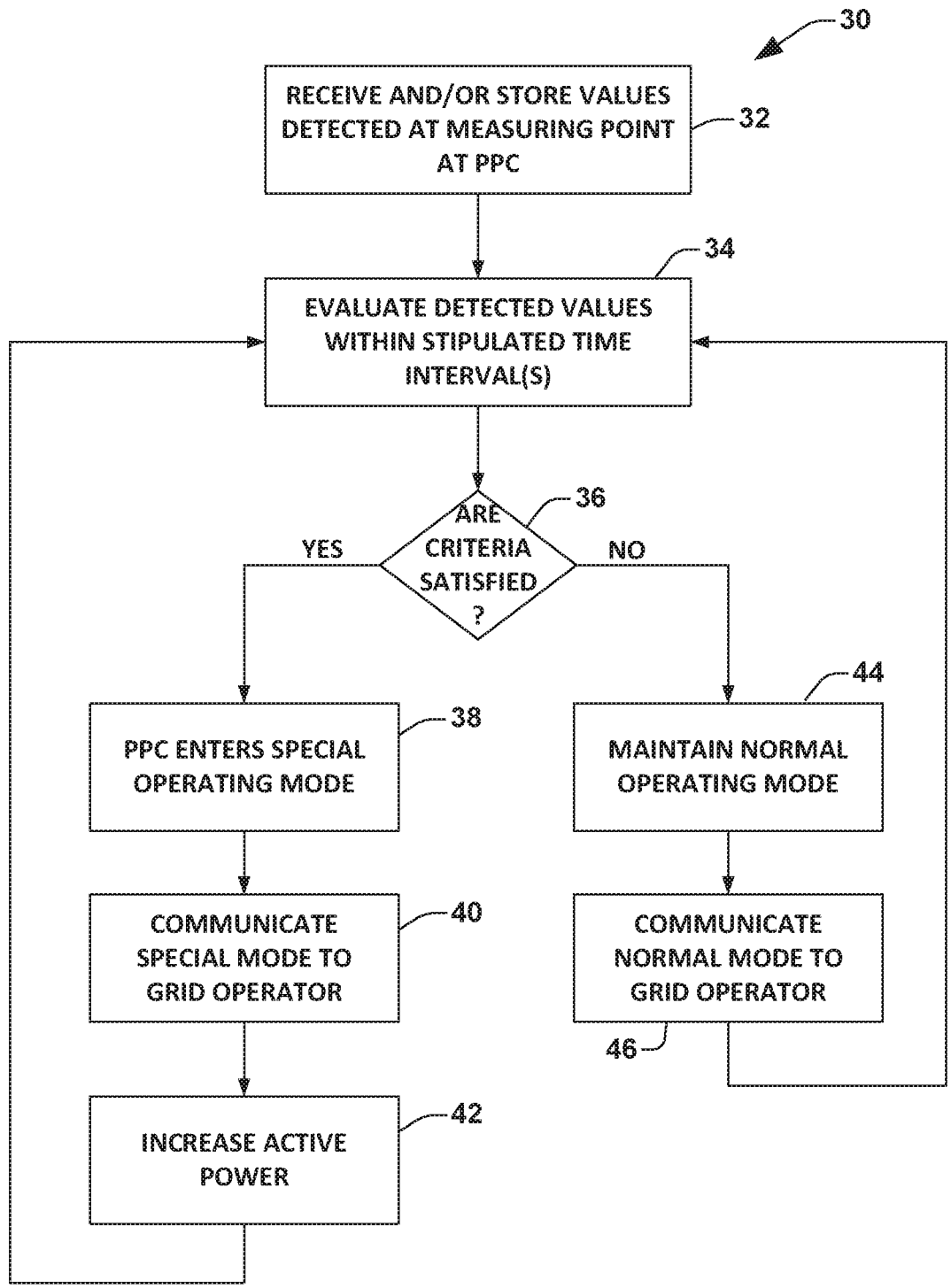
FIG. 3 shows a method for regulating a decentralized energy generating system with a plurality of inverters according to the disclosure.

The method according to the disclosure is illustrated in FIG. 3 at 30, in particular the check as to whether the three criteria relevant to a change to the special operating mode of the energy generating system 1 are present, is, in one embodiment, carried out in the central control unit PPC. For this purpose, the control unit PPC stores the values—detected by the measuring point 3—of the voltage amplitude, of the active power and of the reactive power for an evaluation within the stipulated time intervals at 32. The detected values can of course be suitably filtered or averaged in order to reduce measurement errors. Within the evaluation at 34, the control unit PPC determines for example the minimum values and maximum values of the voltage amplitude, of the active power and of the reactive power, calculates therefrom an increase or respectively a decrease in the values within the time interval by difference formation and compares the calculated increase or respectively decrease to the corresponding stored threshold values. In the event of all three criteria being satisfied within a time interval (YES at 36), the central control unit PPC changes to the special operating mode at 38. In the special operating mode, the fed-in active power of the energy generating system 1 is reduced to an extent such that an infeed of an active power which exceeds the uptake capacity of the grid 2 is precluded. In this case, the reduction can be stipulated as an absolute magnitude value, as a percentage of the rated power or of the currently available power of the energy generating system 1, or in some other way.

A change to the special operating mode can be communicated to the grid operator by means of a corresponding communication signal at 40. A change to the special operating mode can likewise be enforced by means of a communication signal of the grid operator. In the special operating mode, it is conceivable for the central control unit PPC to still react to changes in the target values resulting from the grid operator and to adapt its infeed of active power and/or reactive power accordingly.

For a return to the normal operating mode, the control unit PPC can attempt to increase the fed-in active power in stages or continuously up to target values stipulated by the grid operator at 42, and in the process continuously monitor the grid parameters with the aid of the measuring point 3. If the stipulated target values are reached without disturbing values of the grid parameters arising (NO at 36), the energy generating system 1 can return to the normal operating mode at 44. This return can likewise be communicated to the grid operator by means of a corresponding communication signal at 46, or a return to the normal operating mode can be enforced by a communication signal of the grid operator.

Figure 4:
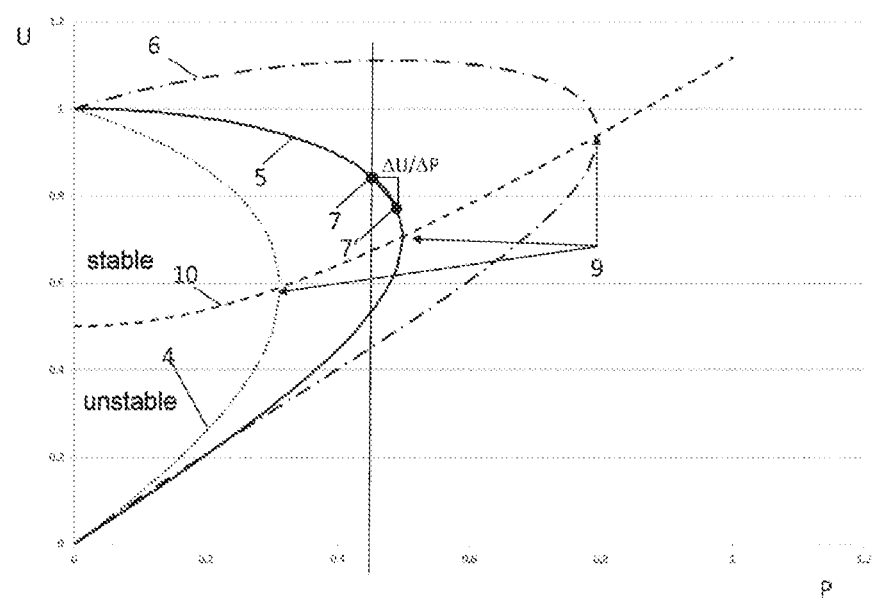
FIG. 4 shows a variation of "nose curves" and operating points of an infeed of an energy generating system according to the disclosure on these "nose curves" for exemplary illustration of the regulating method according to the disclosure.

FIG. 4 shows idealized profiles of "nose curves" for various power factors $\cos \Theta$ as a function of the power P fed in. In this regard, nose curve 5 is a profile that arises for a power factor $\cos \Theta=1$, nose curve 6 is assigned to an overexcited power factor $\cos \Theta=0.9$ and nose curve 6 is assigned to an underexcited power factor $\cos \theta\Theta=0.9$. In this case, power P and voltage U are plotted in a normalized manner. Each nose curve has a maximum power point 9, the position of which for a changing power factor is represented by the curve 10, which simultaneously separates the stable operating range from the unstable operating range of the energy generating system 1 at the grid. The power fed in is not permitted to exceed this maximum power point, in order to ensure stable grid conditions. For this purpose, it is necessary to ascertain when an operating point approaches the vicinity of a maximum power point.

Operating point 7 on nose curve 5 is chosen to illustrate the chosen three criteria for the change to the special operating mode.

In order to ascertain whether a present operating point is in the vicinity of a maximum power point and moving toward the latter, the changes in the voltage amplitude and in the active power fed in at the grid connection point PCC are determined in a time interval. It is only if the present operating point is in a region of a nose curve with a sufficiently high negative gradient (as here the operating point 7 on nose curve 5) that both a decrease in the voltage amplitude and an increase in the active power simultaneously exceed the threshold values assigned to them. This is illustrated in FIG. 4 by the transition from the operating point 7 to the operating point 7', where the decrease in the voltage amplitude ΔU and the increase in the power ΔP fed in are represented.

However, a decrease in the voltage amplitude can also be caused by a change in the reactive power in the direction of an underexcitation. This is illustrated by the nose curve 4, the voltage values U of which in the stable region of the nose curve lie below the voltage values of nose curve 5 for all achievable values of the active power P. In order to rule out this cause, the criterion is checked as to whether there is a reactive power change in the direction of an underexcitation which might have caused or concomitantly caused the decrease in the voltage amplitude. Only if this is not the case is a change to the special operating mode carried out.

It is conceivable that the three criteria will not reliably identify every approach to a maximum power point and thus the risk of a change to the unstable region of the nose curves, but in practice, given a suitable choice of threshold values and time intervals, the criteria are sufficient to ensure stable operating conditions of the energy generating system.

The invention claimed is:

1. A method for regulating a decentralized energy generating system with a plurality of inverters (IN), the infeed of which into a grid is determined by driving by means of a central control unit (PPC), the method comprising:
   receiving at the PPC a detected active power, reactive power and voltage amplitude at a grid connection point (PCC) of the energy generating system; and
   regulating, in a normal operating mode of the energy generating system, the reactive power and the active power to target values stipulated by a grid operator by virtue of the central control unit (PPC) dividing the stipulated target values into individual target stipulations for the plurality of inverters (IN) and communicating individual target stipulations to the inverters (IN); and
   selectively changing to a special operating mode of the energy generating system if the following three criteria are present at the grid connection point (PCC) in a stipulated time interval:
   a decrease in the voltage amplitude by more than a stipulated first threshold value;
   an active power increase by more than a stipulated second threshold value; and
   a reactive power change which does not exceed a stipulated third threshold value in the direction of an underexcitation,
   wherein, in the special operating mode, the central control unit (PPC) effects a reduction of the active power provided at the grid connection point (PCC) compared to the stipulated target values.

2. The method as claimed in claim 1, wherein in the special operating mode, the central control unit (PPC) additionally effects a change in the reactive power provided at the grid connection point (PCC) in the direction of an overexcitation independently of the stipulated target values.

3. The method as claimed in claim 1, wherein ascertaining the decrease in the voltage amplitude and the active power increase is carried out at the PPC by comparing differences between actual values at the beginning and at the end of the stipulated time interval to the respective threshold values.

4. The method as claimed in claim 1, wherein the central control unit (PPC) effects a reduction of the active power provided at the grid connection point (PCC) and/or a change in the reactive power provided at the grid connection point (PCC) in the direction of an overexcitation by communicating to the inverters (IN) individual special target stipulations that are correspondingly changed compared to the individual target stipulations.

5. The method as claimed in claim 1, wherein the change to the special operating mode of the energy generating system is signaled to the grid operator.

6. The method as claimed in claim 1, further comprising returning to the normal operating mode by a control signal of the grid operator being communicated to the central control unit (PPC).

7. A decentralized energy generating system with a plurality of inverters (IN) and a central control unit (PPC) configured to drive the plurality of inverters (IN), wherein the driving comprises, in a normal operating mode, dividing and communicating individual target stipulations to the plurality of inverters (IN) depending on target values stipulated by a grid operator for an infeed of active power and reactive power into a grid via grid connection point (PCC) of the decentralized energy generating system, wherein the central control unit (PPC) is configured to effect a change to a special operating mode of the energy generating system by effecting a reduction of the active power provided at the grid connection point (PCC) compared to the target values if the following three criteria are present at the grid connection point (PCC) in a stipulated time interval:
   a decrease in the voltage amplitude by a stipulated first threshold value;
   an active power increase by a stipulated second threshold value; and
   a reactive power change which does not exceed a stipulated third threshold value in the direction of an underexcitation.

8. The decentralized energy generating system as claimed in claim 7, wherein a maximum possible active power output of the energy generating system is greater than a maximum permissible active power uptake capacity of the grid connected to the grid connection point (PCC) taking account of a power exchange of other grid participants connected to the grid.

* * * * *